April 27, 1943.                K. R. FRITZ                2,317,902
BEARING FOR MINIATURE ELECTRIC MOTORS
Filed Jan. 31, 1941
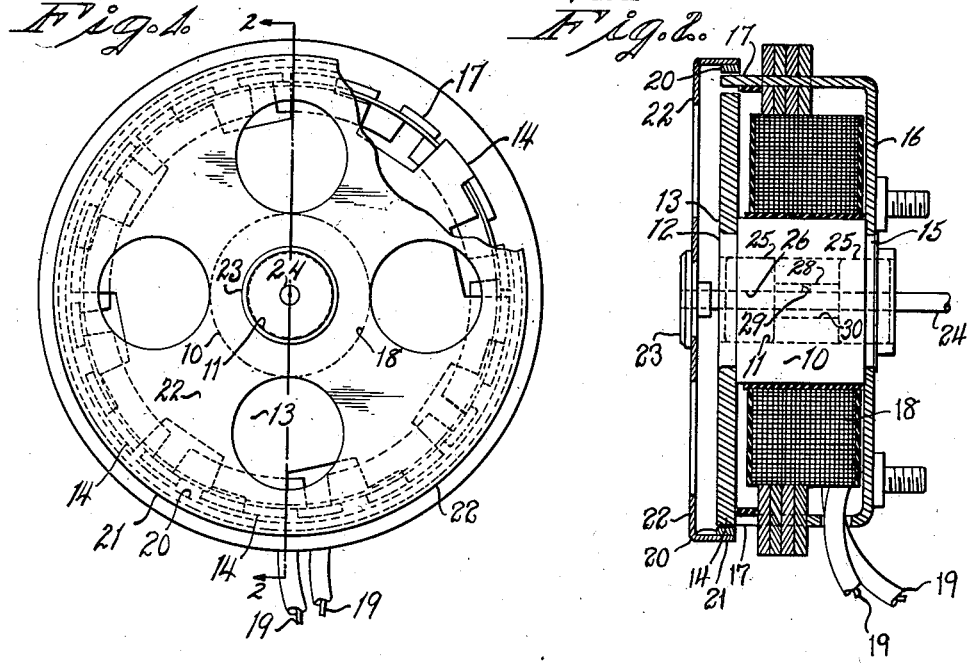
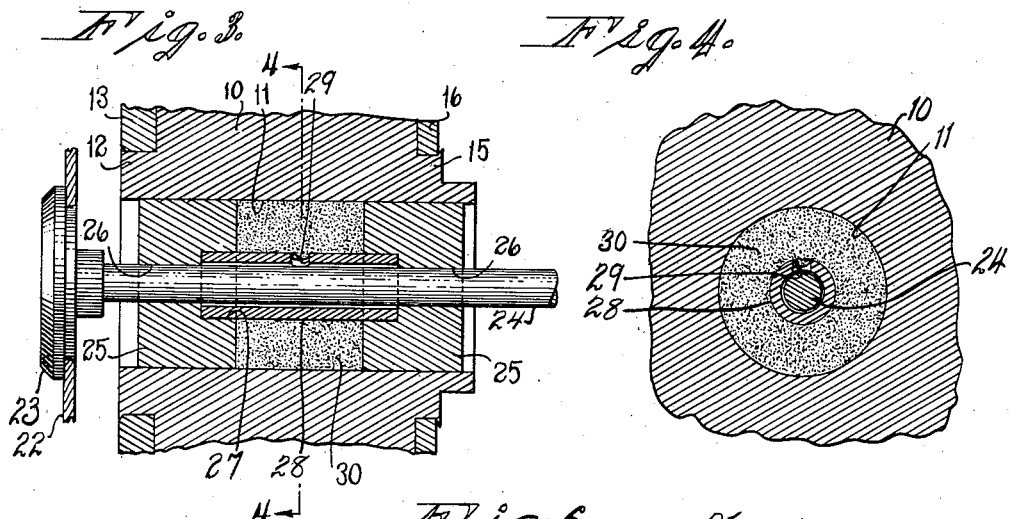
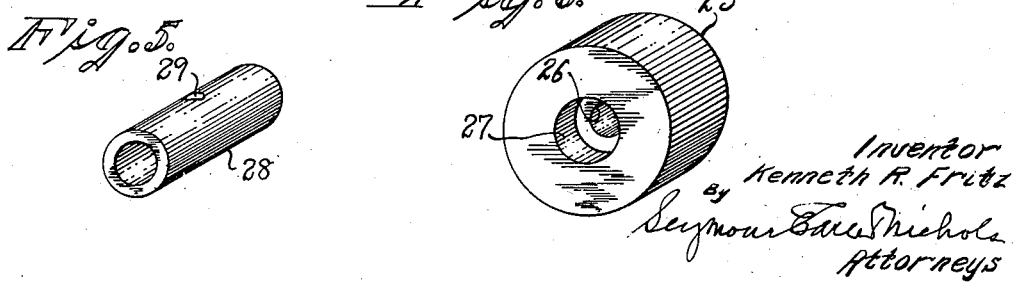
Inventor
Kenneth R. Fritz
By Seymour Ellis Nichols
Attorneys Patented Apr. 27, 1943

2,317,902

UNITED STATES PATENT OFFICE 2,317,902

BEARING FOR MINIATURE ELECTRIC MOTORS

Kenneth R. Fritz, Bristol, Conn., assignor to The Sessions Clock Company, Forestville, Conn., a corporation of Connecticut Application January 31, 1941, Serial No. 376,802

2 Claims. (Cl. 308—111)

The present invention relates to improvements in bearings for electric motors, and more particularly to bearings for miniature electric motors commonly used in propelling clocks and other time instruments.

It has heretofore been proposed to provide bearings for miniature electric motors in which a body of grease or other lubricant is stored with the intent that such lubricant will feed so slowly to the actual bearing-surfaces as to provide for the lubrication of the motor over a long period of time. In many instances, however, this stored lubricant has rapidly worked its way out of the bearing-structure, with the result that not only is the clock mechanism or the like badly discolored but the lubricant is dissipated in a short period and the bearings run dry to the detriment of the operation. Efforts to correct the fault just referred to have also been made, with the result that most often the stored lubricant has remained stored and has not fed itself properly to the bearing-surfaces and the final results were generally similar to the escape of the lubricant.

One of the objects of the present invention is to provide a superior bearing for miniature electric motors which will retain a body of lubricant and at the same time reliably feed the same in small substantially-continuous amounts to the actual bearing-surfaces.

With the above and other objects in view, as will appear to those skilled in the art from the present disclosure, this invention includes all features in the said disclosure which are novel over the prior art.

In the accompanying drawing, in which certain modes of carrying out the present invention are shown for illustrative purposes:

Fig. 1 is a face view of a synchronous electric motor embodying the present invention;

Fig. 2 is a transverse sectional view thereof taken on the line 2—2 of Fig. 1, with the core piece of the motor left in elevation;

Fig. 3 is a broken sectional view on a larger scale and taken through the center of the motor-structure;

Fig. 4 is a transverse sectional view taken on the line 4—4 of Fig. 3;

Fig. 5 is a perspective view of the retaining-tube, detached; and

Fig. 6 is a similar view of one of the two corresponding bearing-blocks, detached.

The particular miniature electric motor herein chosen for the purpose of illustrating the present invention includes a cylindrical core 10 formed of soft iron or the like and having an axial passage 11 extending therethrough from end to end. At its forward end the core 10 is formed with a neck 12 upon which is rigidly mounted a plate-like pole-piece 13 formed of magnetically-permeable material and provided upon its periphery with an annular series of pole-salients 14.

At its rear end the core 10 is formed with a neck 15 upon which is rigidly mounted a cup-shaped pole-piece 16 of magnetically-permeable material having on its forward edge an annular series of pole-salients 17 interspersed between the pole-salients 14 of the plate-like pole-piece 13 before referred to.

Surrounding the core 10 and interposed between the plate-like pole-piece 13 and the bottom-wall of the cup-shaped pole-piece 16 is an energizing-coil 18 having a pair of leads 19—19 by means of which the coil may be connected to a suitable source of alternating current.

Extending around the peripheries of the annular series of pole-salients 14 and 17 is a rotor-ring 20 formed of hardened steel or its equivalent and frictionally mounted within the rearwardly-extending flange 21 of a cup-shaped skeletonized rotor-frame 22. The said rotor-frame is preferably formed of aluminum or other non-magnetic material, and is staked or otherwise secured to a collar-like hub 23 which in turn is rigidly mounted upon the forward end of a rotor-shaft 24 extending axially through the passage 11 in the core 10 and supported therein in a manner as will hereinafter appear.

Forced into the axial passage 11 in the core 10 with a tight fit, are two corresponding but oppositely-facing bearing-blocks 25—25 are formed of porous material preferably in the form of sintered bearing-metal which will permit the passage of lubricating material through its pores. Each of the said bearing-blocks is provided with an axial bearing-passage 26 sized to receive with a running fit the adjacent portion of the rotor-shaft 24 before referred to. In its inner face, each of the two bearing-blocks 25—25 is formed with a cylindrical recess or counterbore 27 arranged coaxially with respect to the adjacent bearing-passage 26 and designed and adapted to receive with a snug fit, the adjacent end of a retaining-tube 28 which also functions as a spacing-tube in holding the two bearing-blocks 25—25 in axially-spaced relationship.

As thus constructed and arranged, the retaining-tube 28 extends axially in the passage 11 in the core 10 and spans the gap between the two bearing-blocks 25—25. Preferably and as shown, the interior diameter of the retaining-tube 28 is larger than the diameter of the portion of the rotor-shaft 24 extending therethrough so as to provide an air-passage. Formed centrally in one side of the retaining-tube 28 midway the length thereof is an air-inlet passage 29 functioning in a manner as will hereinafter appear.

The tubular space within the core 10 and bounded at each of its respective opposite ends by the respective inner faces of the bearing-blocks 25—25 and bounded on its respective outer and inner peripheries by the surface of the passage 11 and the outer periphery of the retaining-tube 28, is packed with a mass 30 of grease or other suitable lubricant.

When the energizing-coil 18 is supplied with alternating current, the pole-salients 14 and 17 will be respectively of opposite polarity at a given instant, and will tend to hold the rotor-ring 20 in axial alignment with the pole-piece 13 during the rotation of the latter.

The grease 30 will penetrate outwardly into both of the porous bearing-blocks 25—25 and will reach the surfaces of the respective bearing-passages 26 therein to provide lubrication for the rotor-shaft 24. Air will slowly enter into the interior of the spacing-tube 28 by way of the minute space between the periphery of the rotor-shaft 24 and the surfaces of the respective bearing-passages 26—26 in the bearing-blocks 25—25. The air referred to will then be free to pass radially outwardly through the air-inlet or relief-passage 29 in the retaining-tube 28 to thus avoid the tendency to create a vacuum in the space surrounding the said retaining-tube. In this manner, as the lubricant slowly passes outwardly through the pores of the bearing-blocks 25—25, the missing volume is replaced by air passing as above described.

In the manner above described, the lubricant 30 will be freed for passage through the pores of the bearing-blocks 25—25 to a degree sufficient to maintain proper lubrication for the rotor-shaft 24, by the minute amount of air passing radially outwardly through the air-inlet passage 29 in the retaining-tube 28. This action will take place without, however, causing the lubricant 30 to leak out so rapidly as to creep by capillary action over the entire surface of the motor-structure, as usually has been the case when a supposed air-inlet passage has been provided between the outer periphery of a bearing-block and the wall of the passage 11 or its equivalent.

It has been found that in the particular structure shown, an air-inlet passage such as 29 having a diameter of about .030″ is preferred.

By means of the present invention, it is possible to assure an adequate supply of lubricant to the actual bearing-surfaces without, however, occasioning the undue loss of lubricant by its spreading by capillary action over the surfaces of the motor-structure.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A bearing for miniature electric motors in combination with a motor-structure including a member having a passage therethrough; of a pair of porous bearing-members each having a bearing-passage therein and mounted in the passage in the said member of the motor-structure in axially-spaced-apart relationship to provide a lubricant storage-space therebetween; a shaft extending in the bearing-passages of the said bearing-members and spanning the gap therebetween; and a relatively non-porous spacing-tube extending between the two said spaced-apart porous bearing-members and enclosing an intermediate portion of the said shaft and provided with a relief-passage extending from the interior of the said spacing-tube to the exterior thereof in communication with the lubricant storage-space between the two said spaced-apart bearing-members, the interior diameter of the said spacing-tube being materially larger than the diameter of the portion of the said shaft extending therethrough, and the inner surface of the said spacing-tube being free of bearing-engagement with the said shaft throughout substantially the full length of the said spacing-tube.

2. A bearing for miniature electric motors in combination with a motion-structure including an axial core formed of magnetic material and having a passage extending therethrough from end to end; of a pair of porous bearing-members each having a bearing-passage therein and each tightly mounted in the passage in the said core in axially-spaced-apart relationship to provide a lubricant storage-space therebetween and within the said core; a shaft extending in the bearing-passages of the said bearing-members and spanning the gap therebetween; and a relatively non-porous spacing-tube extending between the two said spaced-apart porous bearing-members and enclosing an intermediate portion of the said shaft and provided with a relief-passage extending from the interior of the said spacing-tube to the exterior thereof in communication with the lubricant storage-space between the two said spaced-apart bearing-members, the interior diameter of the said spacing-tube being materially larger than the diameter of the portion of the said shaft extending therethrough, and the inner surface of the said spacing-tube being free of bearing engagement with the said shaft throughout substantially the full length of the said spacing-tube.

KENNETH R. FRITZ.